United States Patent
Van Kampen (10) Patent No.: US 10,656,943 B2
(45) Date of Patent: May 19, 2020

(54) INSTRUCTION TYPES FOR PROVIDING A RESULT OF AN ARITHMETIC OPERATION ON A SELECTED VECTOR INPUT ELEMENT TO MULTIPLE ADJACENT VECTOR OUTPUT ELEMENTS

(71) Applicant: Telefonaktiebolaget LM Ericsson (publ), Stockholm (SE)

(72) Inventor: David Van Kampen, Eindhoven (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 390 days.

(21) Appl. No.: 15/024,095

(22) PCT Filed: Sep. 17, 2014

(86) PCT No.: PCT/EP2014/069795
§ 371 (c)(1),
(2) Date: Mar. 23, 2016

(87) PCT Pub. No.: WO2015/040060
PCT Pub. Date: Mar. 26, 2015

(65) Prior Publication Data
US 2016/0239297 A1 Aug. 18, 2016

(30) Foreign Application Priority Data
Sep. 23, 2013 (EP) .................................... 13185484

(51) Int. Cl.
*G06F 9/302* (2018.01)
*G06F 9/30* (2018.01)
(Continued)

(52) U.S. Cl.
CPC ........ *G06F 9/30036* (2013.01); *G06F 7/4812* (2013.01); *G06F 9/3001* (2013.01); *G06F 15/82* (2013.01)

(58) Field of Classification Search
CPC .. G06F 7/4812; G06F 9/3001; G06F 9/30032; G06F 9/30036; G06F 9/3887
See application file for complete search history.

(56) References Cited

U.S. PATENT DOCUMENTS 4,354,249 A 10/1982 King et al.
5,936,872 A * 8/1999 Fischer ................. G06F 7/4812
708/622

(Continued)

OTHER PUBLICATIONS

Wolfram MathWorld, "Complex Multiplication", Oct. 30, 2012, 1 page.*

(Continued)

*Primary Examiner* — David J. Huisman
(74) *Attorney, Agent, or Firm* — Murphy, Bilak & Homiller, PLLC (57) ABSTRACT

According to an aspect, a digital signal processor obtains a program instruction, selects a first real valued input or a second real valued input as a given real valued input (the first and second real valued inputs organized as adjacent elements of a first input vector), depending on an instruction type. The processor performs an arithmetic operation on the selected real valued input to provide a real valued result, and provides a first real valued output and a second real valued output during a first operation cycle (organized as adjacent elements of a second output vector).

The real valued result is provided as the first real valued output and as the second real valued output, depending on the instruction type, and the second output vector is a real valued second output vector for real-complex multiplication with a complex valued third vector.

7 Claims, 4 Drawing Sheets

(51) Int. Cl.
G06F 7/48 (2006.01)
G06F 15/82 (2006.01)

(56) References Cited

U.S. PATENT DOCUMENTS

| | | | |
|---|---|---|---|
| 6,816,961 B2 * | 11/2004 | Rice | G06F 9/30025 |
| | | | 712/223 |
| 7,546,330 B2 | 6/2009 | Taunton et al. | |
| 8,200,945 B2 | 6/2012 | Chatterjee et al. | |
| 9,672,034 B2 * | 6/2017 | Sperber | G06F 9/30032 |
| 2002/0004809 A1 * | 1/2002 | Golliver | G06F 9/30025 |
| | | | 708/622 |
| 2005/0125636 A1 | 6/2005 | Ford et al. | |
| 2009/0077154 A1 * | 3/2009 | Matsuyama | G06F 7/5443 |
| | | | 708/523 |
| 2012/0011348 A1 | 1/2012 | Eichenberger et al. | |
| 2012/0166511 A1 | 6/2012 | Hiremath et al. | |
| 2012/0173600 A1 | 7/2012 | Park et al. | |

OTHER PUBLICATIONS

Stack Overflow, "Complex Mul and Div using SSE Instructions", Jul. 2010, pp. 1-3.*

* cited by examiner

INSTRUCTION TYPES FOR PROVIDING A RESULT OF AN ARITHMETIC OPERATION ON A SELECTED VECTOR INPUT ELEMENT TO MULTIPLE ADJACENT VECTOR OUTPUT ELEMENTS

TECHNICAL FIELD

The present invention relates generally to the field of digital signal processing. More particularly, it relates to a class of instructions suitable for optimizing operations of vector processors.

BACKGROUND

Digital signal processing may be implemented by way of a programmable digital signal processor (DSP) adapted to receive program instructions (e.g. chosen from a number of predefined instructions and possibly comprising one or more arguments) and execute operations accordingly. Digital signal processing may, for example, be applied on digital baseband signals (i.e. digital baseband signal processing). Furthermore, digital signal processing may be practiced in a variety of electronic appliances, e.g. wireless communication modems.

In a typical digital baseband signal processing application, streams of samples are processed according to the instructions fed to the DSP. The samples are typically complex numbers, each represented by a real part, I, having a value $x_I$ and an imaginary part, Q, having a value $x_Q$. Commonly a complex number, x, may be expressed as $$x = x_I + jx_Q; x \in \{Z\}.$$

Execution of a complex-complex multiplication instruction, $z = x*y$ (i.e. an instruction to multiply a complex number, x, with another complex number, y, where x, y, $z \in \{Z\}$) on a DSP involves four real valued multiplications and two real valued additions $$z_I = x_I y_I - x_Q y_Q, \text{ and}$$

$$z_Q = x_I y_Q + x_Q y_I, \text{ where}$$

$$z = z_I + jz_Q; z \in \{Z\}.$$

Such a multiplication will be termed a complex multiplication in the following. Thus, to perform a complex multiplication with a latency of a single clock cycle, a calculation circuit with four parallel multipliers has to be deployed in the DSP.

One common operation that is performed on a stream of complex samples is scaling each sample value, x, with a real number, c:

$$w = cx; x, w \in \{Z\}.$$

Such a multiplication will be termed a real-complex multiplication in the following. In a DSP context, a real-complex multiplication may be performed by using a complex multiplication instruction where the imaginary part of the scaling argument is set to zero, i.e.

$$c_{compl} = c_I + jc_Q; c_{compl} \in \{Z\}, \text{ where}$$

$$c_I = c, \text{ and}$$

$$c_Q = 0.$$

Alternatively, a real-complex multiplication may be performed by using a real-real multiplication instruction (multiplication between two real numbers):

$$w_I = cx_I; c, x_I \in \{R\},$$

$$w_Q = cx_Q; c, x_Q \in \{R\}, \text{ where}$$

$$w = w_I + jw_Q; w \in \{Z\}.$$

The first approach to real-complex multiplication requires deploying four parallel multipliers to perform the multiplication with a latency of a single clock cycle, while the second approach requires deploying two parallel multipliers. The second approach is typically preferable since it uses a lower number of multipliers and therefore consumes less power. Sometimes, the result is also ready earlier than for the first approach (lower latency) mainly due to the extra addition step required in the first approach. In some implementations, the first and second approaches both finish within a clock cycle and the second approach tolerates a higher clock frequency. In some implementations, the first approach requires two clock cycles while the second approach requires one clock cycle.

Real-complex multiplication (e.g. a scaling operation) may use vectors (e.g. scaling vectors or constant vectors) calculated using, for example, reciprocal, division, square-root, or reciprocal-square-root functions. These types of instructions are often critical in, for example, communication applications and may be an important contributor to determining the number of cycles and/or the amount of power (or other resources) a DSP has to spend to complete a specific processing task.

Vector digital signal processors (also termed digital signal vector processors herein) perform operations on vectors of data in stead of on individual samples. A DSP processing individual samples may be seen as a special case of digital signal vector processor. An important class of instructions for digital signal vector processors is single instruction multiple data (SIMD) instructions.

Generally, A SIMD instruction is a vector instruction that performs the same operation (e.g. an arithmetic operation) on each element of an input vector. In a typical digital signal vector processor implementation, the operation is performed by using an array of P identical parallel processing units when processing a vector with P elements.

For example, a real-real vector multiplication (P element-wise multiplications between two vectors, vrA, vrB, of length P) operation performed on a digital signal vector processor is typically based on P parallel multiplier hardware circuits:

```
for (int p=0; p<P; p++)
{
    vrD[p] = vrA[p] * vrB[p];   //vrX[p]: element p of vector register X
}
```

Digital signal vector processors may also support instructions that operate on complex data types. For such applications, a pair of adjacent vector elements (one even and one odd element) is typically interpreted as a complex value (the even element representing the real part value, and the odd element representing the imaginary part value). Hence, in such applications a real vector of length P may be interpreted as a complex vector of length P/2 (i.e. having P/2 complex elements). A complex-complex vector multiplication operation performed on a digital signal vector processor is typically based on P/2 parallel complex-complex multiplications:

```
for (int p=0; p<P; p=p+2)
{
    vrD[p]   = vrA[p] * vrB[p]   - vrA[p+1] * vrB[p+1];   //re part
    vrD[p+1] = vrA[p] * vrB[p+1] + vrA[p+1] * vrB[p];     //im part
}
```

Based on available hardware parallelism, a digital signal vector processor can typically provide a higher computational throughput than a DSP that operates on a sample-by-sample basis.

It is possible to perform a real-complex multiplication on a vector processor, e.g. scaling of a complex vector X by respective real values $c_p$, p=0, ..., (P/2−1), using a real-real vector multiplication instruction (compare with the example above of using two instructions for real-real multiplication to perform a real-complex scalar multiplication). This may be accomplished if the real values, $c_p$, are first organized in a real vector C of length P, where the real values are duplicated into respective adjacent even and odd elements. The duplication may be achieved by, for example, using a vector shuffle instruction.

Performance requirements for digital signal vector processors tend to increase with every product generation, for example, due to higher load from applications such as ever increasing data bit rates of radio communication according to various standards.

Higher performance requirements may, to a certain extent, be addressed by increasing the number of vector elements, P, processed per SIMD instruction. However, the hardware cost and the power consumption typically increase at least linearly with P. Also, some circuits (e.g. circuits performing vector instructions for reciprocal, square-root, and reciprocal square root) have a certain hardware cost which is not proportional to how often they are used. Hence, simply replicating these circuits P times (with increasing P) has a relatively high cost.

A possibility to lower the area cost is to reuse a circuit to perform operations on multiple vector elements in sequential clock cycles. However, this increases the latency of a single vector instruction which typically impacts the length of the instruction schedule and, thus, increases the execution time.

Thus, other methods to achieve the increasing performance requirements are typically needed or at least beneficial. Simplifying implementation of real-complex multiplications may be one such method to accommodate increasing performance demands.

Thus, there is a need for improved approaches to enabling real-complex multiplications, in particular for digital signal vector processors.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved approaches to enabling real-complex multiplications, in particular for digital signal vector processors.

According to a first aspect, this is achieved by a computer program product comprising a computer readable medium, having thereon a computer program comprising program instructions. At least one of the program instructions is selected from a digital signal processor instruction set, the digital signal processor instruction set comprising at least a first instruction type and a second instruction type.

The computer program is loadable into a digital signal processor and is adapted to cause (when the computer program is run by the digital signal processor) execution of a method comprising obtaining a first program instruction, selecting a real valued input as one of a first real valued input and a second real valued input (the first and second real valued inputs organized as adjacent elements of a first input vector), performing an arithmetic operation on the selected real valued input to provide a real valued result, and providing a first real valued output and a second real valued output during a first operation cycle (the first and second real valued outputs organized as adjacent elements of a second output vector).

The real valued input is selected as the first real valued input if the first program instruction is of the first instruction type and as the second real valued input if the first program instruction is of the second instruction type.

Furthermore (if the first program instruction is of one of the first instruction type and the second instruction type), the real valued result is provided as the first real valued output and as the second real valued output, and the second output vector is a real valued second output vector for real-complex multiplication with a complex valued third vector.

The digital signal processor adapted to execute the instructions may be a digital signal vector processor or a sample-by-sample digital signal processor. If the samples are complex samples, the sample-by-sample digital signal processor may be implemented as a real valued digital signal vector processor with P=2.

According to some embodiments, the digital signal processor instruction set may further comprise a third instruction type. In such embodiments, the step of selecting the real valued input may further comprise selecting the real valued input as the first real valued input if the first program instruction is of the third instruction type. Furthermore, the step of providing the first real valued output and the second real valued output during the first operation cycle may further comprise (if the first program instruction is of the third instruction type) providing the real valued result as the first real valued output and providing a zero value as the second real valued output. In these embodiments, the second output vector may be a complex valued second output vector for complex-complex multiplication with the complex valued third vector, and the first and second real valued outputs represent respective real and imaginary parts of an element of the complex valued second output vector.

According to some embodiments, the digital signal processor instruction set may further comprise a fourth instruction type. If the first program instruction is of the fourth instruction type, the real valued input may be selected as the first real valued input for the first operation cycle and as the second real valued input for a second, subsequent, operation cycle. Furthermore, the real valued result may be provided as the first real valued output during the first operation cycle and as the second real valued output during the second operation cycle, and the second output vector may be a real valued second output vector for real-real multiplication with a real valued fourth vector.

Thus, when the first program instruction is of the first, second or third instruction type, first and second real valued outputs are produced during a single operation cycle, while when the first program instruction is of the fourth instruction type, first and second real valued outputs are produced during two subsequent operation cycles.

A second aspect provides a calculation circuit for a digital signal processor. The calculation circuit is adapted to—responsive to the digital signal processor executing, during a first operation cycle, a first program instruction selected from a digital signal processor instruction set comprising at least a first instruction type and a second instruction type—produce a first real valued output and a second real valued output based on at least one of a first real valued input and a second real valued input, the first and second real valued inputs organized as adjacent elements of a first input vector. The calculation circuit comprises a selector, an arithmetic calculation unit, an output provider and a controller.

The selector is adapted to select a real valued input as one of the first real valued input and the second real valued input based on a selection control signal and is adapted to select the real valued input as the first real valued input responsive to the selection control signal indicating that the first instruction type is being executed, and as the second real valued input responsive to the selection control signal indicating that the second instruction type is being executed.

The arithmetic calculation unit is adapted to perform an arithmetic operation on the selected real valued input to provide a real valued result.

The output provider is adapted to provide the first real valued output and the second real valued output during the first operation cycle based on the real valued result, the first and second real valued outputs organized as adjacent elements of a second output vector.

The controller is adapted to provide the selection control signal to the selector based on the first program instruction, and (in response to the first program instruction being of one of the first instruction type and the second instruction type) cause the output provider to provide the real valued result as the first real valued output and as the second real valued output, wherein the second output vector is a real valued second output vector for real-complex multiplication with a complex valued third vector.

The selector may be a multiplexer according to some embodiments. The arithmetic calculation unit may be an arithmetic logic unit (ALU) according to some embodiments. The arithmetic calculation unit may, for example, comprise one or more adders, one or more multipliers, one or more inverters, one or more look-up tables (LUT), or any combination thereof and may, for example, be adapted to perform one or more of a square root operation, a reciprocal operation, a division operation, and a reciprocal square root operation.

The selection control signal may be adapted to cause the selector to select the first real valued input in response to an instruction of the first instruction type being executed, and the second real valued input in response to an instruction of the second instruction type being executed.

In some embodiments, the calculation circuit may further comprise at least one input register operatively connected to the selector, and at least one output register operatively connected to the arithmetic calculation unit and adapted to provide at least one of the first real valued output and the second real valued output.

According to some embodiments, the calculation circuit may further comprise a first input register adapted to receive the first real valued input and a second input register adapted to receive the second real valued input, wherein the selector is operatively connected to the first and second input registers. The calculation circuit may also comprise a first output register adapted to provide the first real valued output and a second output register adapted to provide the second real valued output, wherein the first and second output registers are operatively connected to the arithmetic calculation unit.

In some embodiments, the calculation circuit may comprise a single input register adapted to receive the selected real valued input (i.e. an input register between the selector and the calculation unit.

In some embodiments, the calculation circuit may comprise a single output register. One example operation for such an embodiment may be when the fourth instruction type is being executed is to let the output register hold the real valued result of the first cycle, and then output the register content and the real valued result of the second cycle simultaneously.

A third aspect is a digital signal vector processor comprising a number, P/2, of calculation circuits according to the second aspect (together adapted to provide the second output vector having a real valued vector length, P) and a vector multiplication unit adapted to perform real-complex multiplication between the real valued second output vector and the complex valued third vector having the complex valued vector length, P/2.

In some embodiments (when the second output vector is a complex valued second output vector having a complex valued vector length, P/2), the vector multiplication unit may be further adapted to perform complex-complex valued multiplication between the complex valued second output vector and the complex valued third vector.

In some embodiments (when the second output vector is a real valued second output vector having a real valued vector length, P), the vector multiplication unit may be further adapted to perform real-real valued multiplication between the real valued second output vector and a real valued fourth vector.

A fourth aspect provides an electronic device comprising at least one of the calculation circuit of the second aspect and the digital signal vector processor of the third aspect. The electronic device may, for example, be a wireless communication device.

In a fifth aspect, a method for a digital signal processor is provided of producing a first real valued output and a second real valued output during a first operation cycle based on at least one of a first real valued input and a second real valued input, the first and second real valued inputs organized as adjacent elements of a first input vector.

The method comprises obtaining a first program instruction for the first operation cycle, wherein the first program instruction is selected from a digital signal processor instruction set comprising at least a first instruction type and a second instruction type.

The method further comprises selecting a real valued input, wherein the real valued input is selected as the first real valued input if the first program instruction is of the first instruction type and as the second real valued input if the first program instruction is of the second instruction type.

The method also comprises performing an arithmetic operation on the selected real valued input to provide a real valued result, and providing the first real valued output and the second real valued output, wherein the first and second real valued outputs are organized as adjacent elements of a second output vector. If the first program instruction is of one of the first instruction type and the second instruction type, the real valued result is provided as the first real valued output and as the second real valued output and the second output vector is a real valued second output vector for real-complex multiplication with a complex valued third vector.

In some embodiments, the second, third, fourth and fifth aspects may additionally have features identical with or corresponding to any of the various features as explained above for the first aspect, and vice versa.

An advantage of some embodiments is that the digital signal processor instruction set supports real-complex multiplication operations (as well as complex-complex and real-real multiplication operations).

By supporting real-complex multiplication operations the energy consumption (e.g. in the multiplier circuits) may be decreased. Furthermore, fewer resources may be occupied for performing the multiplication operations (e.g. four multipliers instantiated to support complex-complex multiplication may be used for performing two parallel real-complex multiplications).

If the proposed class of digital signal processor instructions is added to the instruction set of a digital signal vector processor (e.g. to enable calculation of a vector of P scaling values with only P/2 arithmetic circuits), area cost may be reduced without adding latency to the instruction.

Some embodiments may provide two result elements of a vector during a single operation cycle, which may improve power consumption, latency and/or area requirements.

According to some embodiments, the organization of elements in the second output vector is such that the second output vector may be used directly in a multiplication operation.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a digital signal processor instruction set that enables real-complex multiplications is applied. The instruction set is extended with instructions from a class of instructions that may, for example, be used to calculate P scaling values (to be used for a real-complex multiplication for length P vectors) using only P/2 circuits.

As mentioned above, it is possible to perform real-complex multiplications on a vector processor using a real-real vector multiplication instruction if the real values are first organized in a real vector where the real values are duplicated into respective adjacent even and odd elements. However, due to the duplication of elements, half of the power is basically wasted (performing the same arithmetic calculation in two separate calculation units). Having two circuits performing the same calculation is also especially wasteful in terms of circuit area for arithmetic vector instructions that are not used particularly often. A related example is disclosed in U.S. Pat. No. 8,200,945 B2 where a vector unit of a microprocessor is adapted to replicate data on a data bus in a primary and a secondary vector register file.

In a digital signal processor instruction set according to some embodiments, each instruction consumes only one value (first or second, real or imaginary, even or odd, depending on the representation) from a pair of input (vector) elements and produces two (identical) output values using a single arithmetic (hardware) circuit. This class of instructions is particularly beneficial for calculating (real) vectors of scaling values for the purpose of real-complex multiplication.

In some embodiments, the digital signal processor instruction set may also comprise instructions that produce an output value (using the arithmetic unit) and a zero value, which may be beneficial for engineering a real-complex multiplication based on a complex-complex multiplication.

In additional embodiments, the digital signal processor instruction set may also comprise instructions that produce two (typically non-identical) output values, which may, for example, be beneficial for calculating real vectors intended for real-real multiplication.

For a typical prior art digital signal processor instruction set, there is one explicit instruction per functional variant (e.g. each data type variant, each storage location variant for source and result arguments, etc). In some embodiments, a functional variant may be represented in a digital signal processor instruction set by more than one explicit instruction.

For example, a basic real reciprocal vector instruction may have the following form in a prior art type instruction set:

vrec(destination_argument,source_argument), and according to some embodiments, two reciprocal vector instructions (of a first and second instruction type) may be added that replicate the arithmetic result of either even or odd input element:

vrec_rep_even_(destination_argument,source_argument)

and vrec_rep_odd_(destination_argument,source_argument).

Another instruction (of a third instruction type) may also be useful according to some embodiments. This is an instruction type for which an arithmetic operation is done only on the real input element and a zero result is produced for the imaginary output element:

vrec_even_only_(destination_argument,source_argument).

Figure 1:
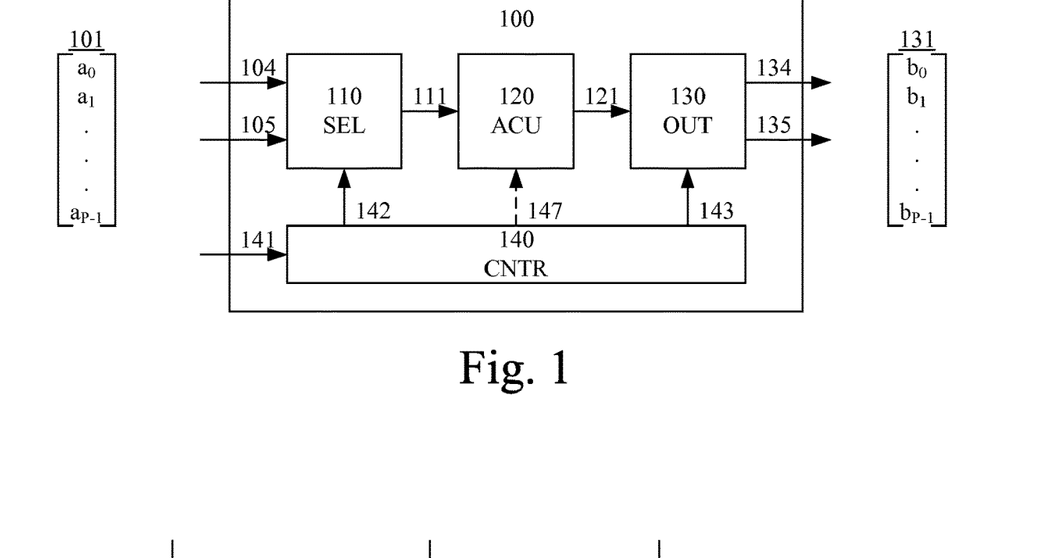
FIG. 1 is a block diagram illustrating an example arrangement according to some embodiments.

FIG. 1 is a block diagram illustrating an example arrangement, e.g. a calculation circuit, 100 according to some embodiments. The arrangement 100 may, for example, be used in a digital signal (vector) processor. The arrangement 100 has a first and a second input 104, 105 accepting first and second real input values, typically adjacent values (even and an odd) of an input vector 101. The arrangement 100 also has a first and a second output 134, 135 providing first and second real output values, typically arranged as adjacent values (even and an odd) of an output vector 131.

An input port 141 of the arrangement 100 receives an indication of the type of instruction that is being executed (either the instruction itself or an operation code based on the instruction type).

The arrangement 100 comprises a selector (SEL) 110, an arithmetic calculation unit (ACU) 120, an output provider (OUT) 130 and a controller (CNTR) 140. The controller receives the indication 141, interprets it, and instructs the other operational units accordingly, as illustrated by respective arrows 142, 143.

The selector 110 is adapted to select one of the first real valued input 104 (for the first instruction type) and the second real valued input 105 (for the second instruction type) based on the selection control signal 142 provided by the controller, and to output the selected value 111. The arithmetic calculation unit 120 is adapted to perform an arithmetic operation on the selected value 111 to provide a result value 121. The operation of the arithmetic calculation unit 120 may be controlled by the controller 140 via a control signal 147, which may indicate the arithmetic function to be performed.

The output provider 130 is adapted to provide the result value 121 of the arithmetic calculation unit 120 at one or more of the first and second outputs 134, 135 based on the control signal 143. For the first and second instruction types the result value 121 is provided at both the first and the second output 134, 135.

For the third instruction type, either the first or the second input 104, 105 may be selected by the selector 110, and the result value 121 is provided at the first output 134 while a zero value is provided at the second output 135.

For a fourth instruction type (corresponding to a conventional instruction), the first input 104 is selected by the selector 110 and the result value 121 is provided at the first output 134 during a first operation cycle, while the second input 105 is selected by the selector 110 and the result value 121 is provided at the second output 135 during a second, subsequent, operation cycle.

Figure 2:
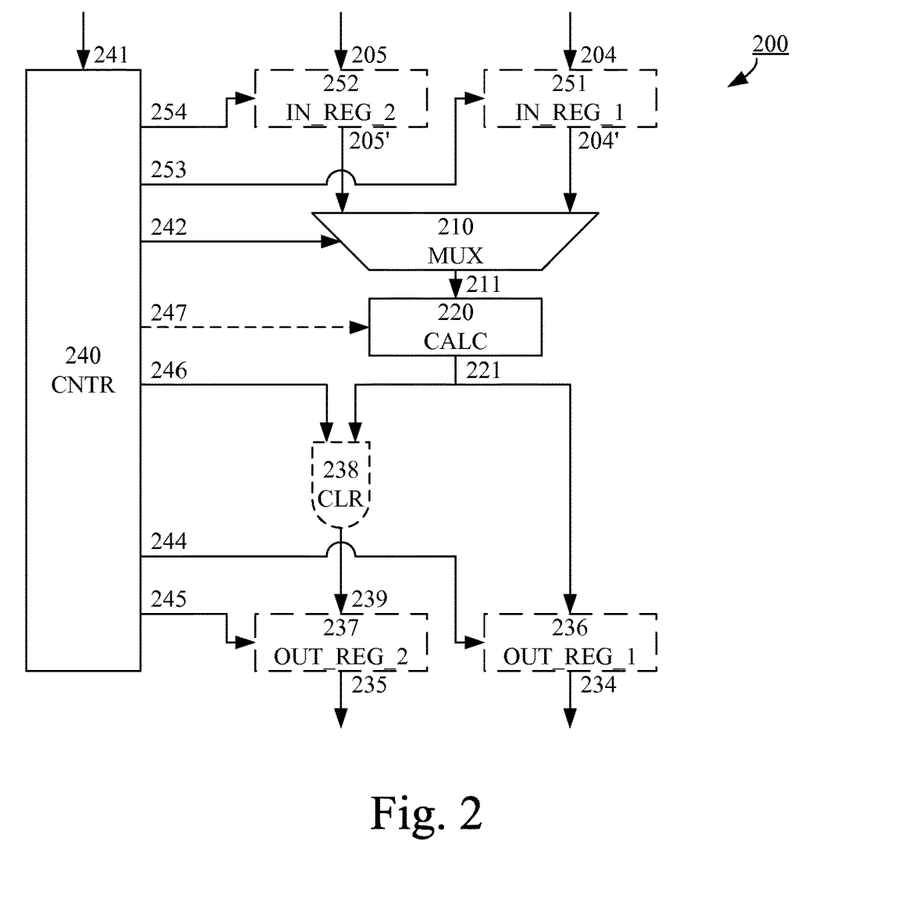
FIG. 2 is a block diagram illustrating an example arrangement according to some embodiments.

FIG. 2 is a block diagram illustrating an example arrangement 200 according to some embodiments, which may be seen as a special case of the arrangement 100 of FIG. 1. Similar elements have been denoted by similar reference numbers and will not be elaborated on further. The controller (CNTR) 240 corresponds to the controller 140 of FIG. 1, and the instruction type indication input 241 corresponds to 141. Furthermore, the inputs 204, 205 and the outputs 234, 235 correspond to 104, 105, 134, 135 respectively.

Optionally, the arrangement 200 comprises first and second input registers (IN_REG_1, IN_REG_2) 251, 252 (controlled by signals 253 and 254 from the controller 240) for receiving and holding values 204', 205' of the respective inputs 204, 205.

In this arrangement, the selector is embodied as a multiplexer (MUX) 210 (controlled by the controller 240 via control signal 242), which selects one of the two input values 204, 205 (or 204', 205' when the input registers are present) and provides the selected value at 211 to a calculation unit (CALC) 220 which operates similarly to the arithmetic calculation unit 120 of FIG. 1 and may accordingly receive a control signal 247 from the controller 240.

The result 221 of the calculation unit 220 is used to provide the output values 234, 235 (optionally via first and second output registers (OUT_REG_1, OUT_REG_2) 236, 237 controlled by signals 245 and 244 from the controller 240). For the first and second instruction types the result value 221 is provided at both the first and the second output 234, 235. For the third instruction type, the result value 221 is provided at the first output 234 while a zero value is provided at the second output 235. For the fourth instruction type, the control signals (enabling signals) 244 and 245 are used to provide the result value 221 at the first output 234 during a first operation cycle and at the second output 235 during a second operation cycle.

The signals 253, 254, 245 and 244 may be enable signals that enable controlled updating of the input/output values (i.e. storing of a new value into the registers). For example, to minimize the transitions of signals in the arithmetic circuit, the input can be controlled by the enable signals such that the input to the selector/arithmetic circuit is held stable by not loading a new value into the register during a specified time (e.g. one or more cycles as appropriate). In the case of the fourth instruction type, only the first output register is updated during the first cycle and only the second output register is updated during the second cycle.

A clearing unit 238 (controlled by the controller 240 via control signal 246 based on the instruction type) may be arranged to produce the value 239 for the second output 235, and may be adapted to pass the result 221 of the calculation unit 220 for instructions of the first, second and fourth instruction type and to output a zero value for the third instruction type. In a typical implementation, the clearing unit 238 may be an array of AND-gates having the result 221 as one input and the control signal 246 as another input, wherein the control signal 246 is set to zero if the third instruction type is under execution.

Thus, a hardware block according to the example in FIG. 2 may be part of a vector DSP, where the circuit block is replicated per element pair. The two input registers may receive a pair of input data elements, possibly from a vector of elements. In the example of FIG. 2, the port for only one input argument of the executed arithmetic operation is shown. If the arithmetic operation has more the one input argument (e.g. a division), there may be multiple instantiations of e.g. the input registers and the selector of the arrangement of FIG. 2.

The controller 140, 240 may typically uphold a state-machine to determine (per clock cycle) which element is selected as input for computation on the arithmetic circuit and which output register is updated. The state-machine may be configured by an instruction pattern (e.g. opcode signal 141, 241) to execute a specific instruction. One possible instruction is to do a computation on both input elements as a two cycle instruction (fourth instruction type), which corresponds to the functionality of a basic, known, class of vector instructions. Three more configuration options exist for three other possible instructions. The state-machine can thus also perform operations on the even or on the odd input element, producing either identical values in the even and odd output elements or a value in the even output element and a zero value on the odd output element.

Figure 3:
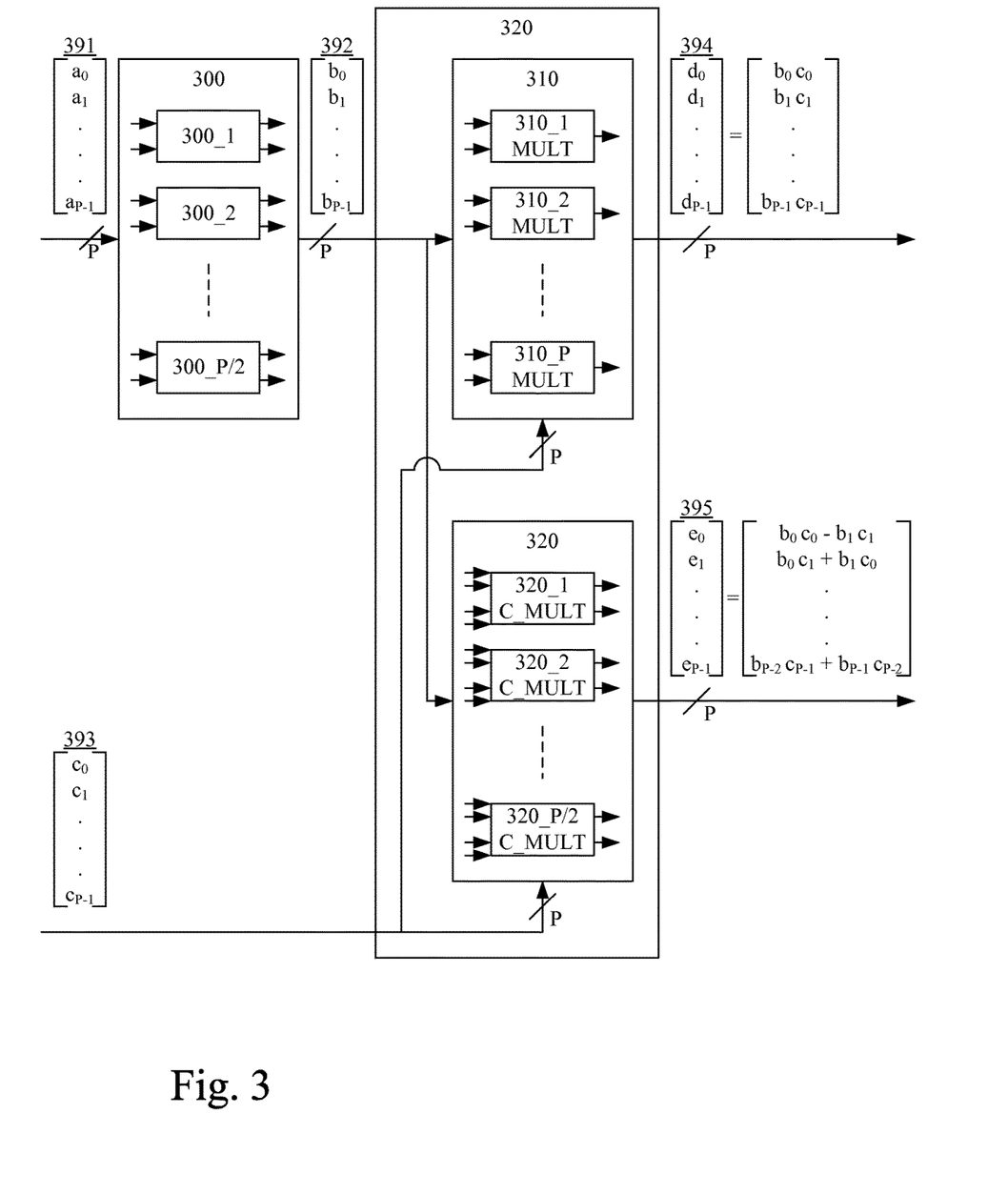
FIG. 3 is a block diagram illustrating an example arrangement according to some embodiments.

FIG. 3 is a block diagram illustrating an example arrangement for a digital signal vector processor according to some embodiments. The example arrangement accepts two input vectors 391, 393, each of length P. In a typical application, the vector 391 is a real-valued vector comprising real values to be used for scaling of the vector 393, which may be a complex-valued vector where adjacent elements represent respective real and imaginary components. For the first, second and third instruction type the vector 391 may, for example, comprise $(a_0, 0, a_2, 0, a_4, 0, \ldots a_{P-2}, 0)$, $(a_0, a_0, a_2, a_2, a_4, \ldots a_{P-2}, a_{P-2})$ or $(a_0, a_1, a_2, \ldots, a_{P-1})$. In the two first cases, half of the values are not used. In the latter case, half of the elements may be used for scaling with 393 and the other half for scaling with another input vector.

The input vector 391 is input to a bank 300 of P/2 calculation units 300_1, 300_2, 300_P/2, each e.g. based on any of the arrangements described in connection to FIGS. 1 and 2. In the calculation unit bank 300, adjacent elements of the vector 391 are processed in respective calculation units as described above to produce a vector 392 of length P.

When an instruction of the first or second type is executed, the vector 392 has pairs of elements with identical values ($b_0=b_1$, $b_2=b_3$, etc). When an instruction of the third type is executed, the even elements of the vector 392 has zero value ($b_1=0$, $b_3=0$, etc).

A vector multiplication unit 320 is adapted to perform multiplication between the vector 392 and the vector 393 to produce a result vector 394, 395, which may, for example, be a scaled version of the vector 393. When an instruction of the first or second type is executed, the vector multiplication unit may achieve a real-complex multiplication by element-wise real multiplication between the vector 392 and the vector 393 in a bank 310 of P real multipliers (MULT) 310_1, 310_2, 310_P. When an instruction of the third type is executed, the vector multiplication unit may achieve a real-complex multiplication by complex multiplication between the vector 392 and the vector 393 in a bank 320 of P/2 complex multipliers (C_MULT) 320_1, 320_2, 320_P/2 (compare with background section). Typically, the bank 310 of real multipliers and the bank 320 of complex multipliers may be implemented using the same hardware elements utilized differently. Thus, the subdivision in FIG. 3 typically represents functional blocks rather than physical blocks.

Figure 4:
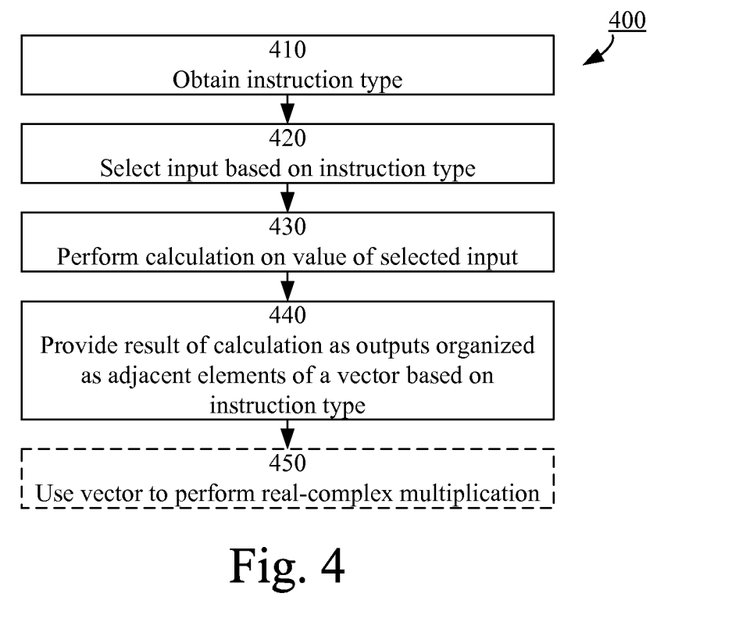
FIG. 4 is a flowchart illustrating example method steps according to some embodiments.

FIG. 4 is a flowchart illustrating an example method 400 according to some embodiments. The method 400 may, for example be executed by any of the arrangements of FIG. 1, 2 or 3.

The method starts in step 410, where an indication of which type of instruction is being executed. This may be in the form of the instruction itself or any indication derived there from. In step 420, one of two input values is selected based on the instruction type as has been explained above and a calculation is performed on the selected value in step 430. In step 440, the result of the calculation is provided at one or more of two outputs as explained above. The two inputs and the two outputs may be adjacent elements of a respective input and output vector, and the output vector may be used in step 450 to perform a real-complex multiplication with another input vector as outlined above.

Figure 5:
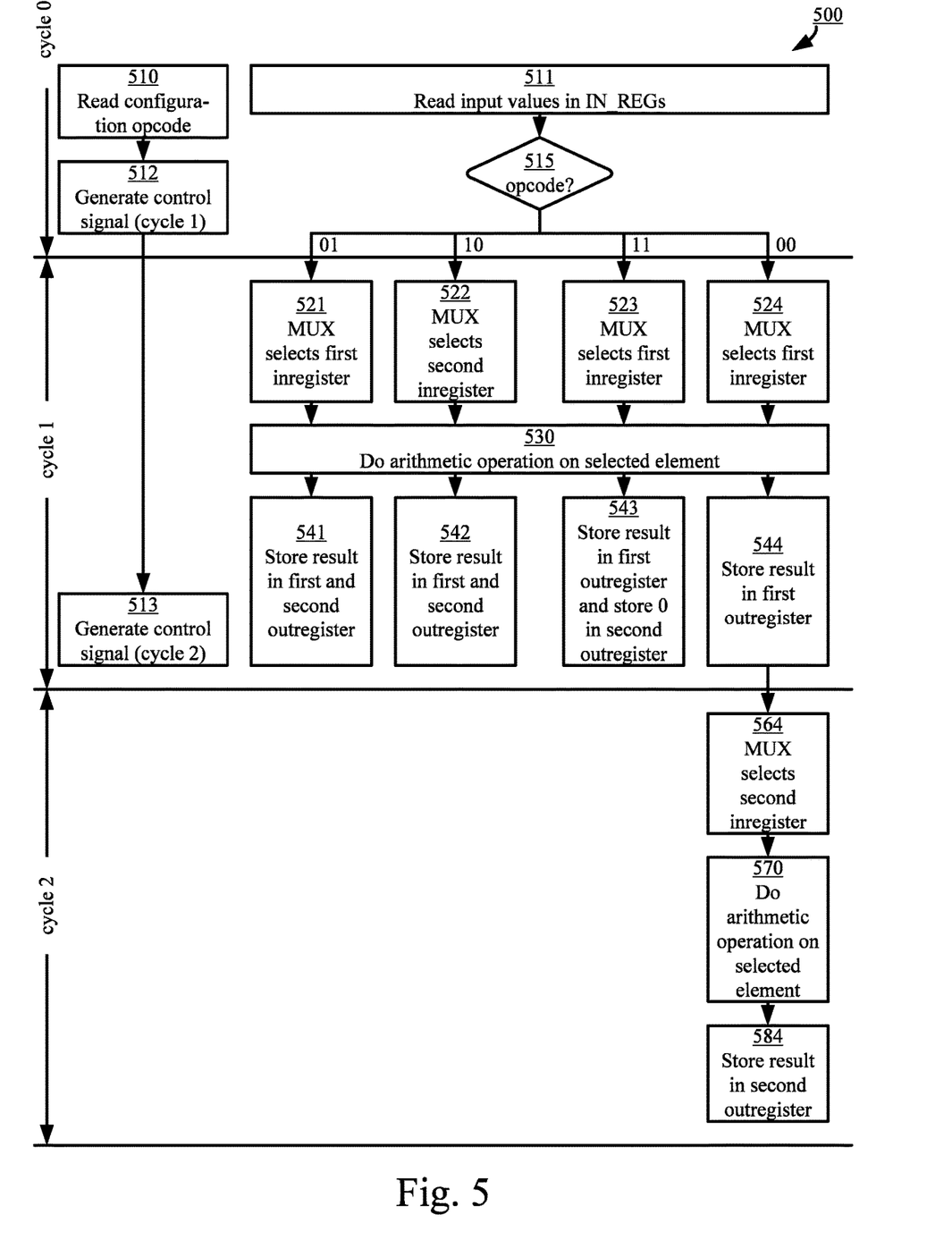
FIG. 5 is a flowchart illustrating example method steps according to some embodiments.

FIG. 5 is a flowchart illustrating an example method 500 according to some embodiments. The method 500 may, for example be executed by any of the arrangements of FIG. 1, 2 or 3. The method 500 may also be compared with the method 400. For example, step 510 may be compared with step 410, steps 521, 522, 523 and 524 may be compared with step 420, step 530 may be compared with step 430, and steps 541, 542, 543 and 544 may be compared with step 440.

In a zeroth operation cycle (cycle 0), a configuration opcode, comprising an instruction type indication, may be read (step 510) and corresponding control signals may be generated (steps 512, 515), for example by a controller such as 140 of FIG. 1 or 240 of FIG. 2. At the same time, input values (compare with 104, 105, 204, 205 of FIGS. 1 and 2) may be read (step 511).

Then, in a first operation cycle (cycle 1), which input to use is selected based on the opcode (steps 521, 522, 523, 524), an arithmetic operation is performed on the selected input value (step 530), and outputs are provided based on the opcode (steps 541, 542, 543, 544) as has been elaborated on above.

If the first instruction type (represented by opcode 01) is being executed, the first input is selected (step 521) and the result of step 530 is stored at both outputs (step 541). If the second instruction type (represented by opcode 10) is being executed, the second input is selected (step 522) and the result of step 530 is stored at both outputs (step 542). If the third instruction type (represented by opcode 11) is being executed, the first input is selected (step 523), the result of step 530 is stored at the first output and a zero is stored at the second output (step 542).

If the fourth instruction type (represented by opcode 00) is being executed, the first input is selected (step 524) and the result of step 530 is stored at the first output (step 544) during the first operation cycle while control signals are generated (step 513) for a second operation cycle (cycle 2). Then, in the second operation cycle, the second input is selected (step 564), an arithmetic operation is performed on the selected input value (step 570), and the result is stored at the second output (step 584).

The following table illustrates one possible implementation that may be application to FIGS. 2 and 5, where $F(\bullet)$ denotes the arithmetic calculation:

| opcode | Instruction type | Behavior |
| --- | --- | --- |
| 01 | 1 | Cycle 1: OUT_REG_I <= F(IN_REG_I) |
|    |   | Cycle 1: OUT_REG_Q <= F(IN_REG_I) |
| 10 | 2 | Cycle 1: OUT_REG_I <= F(IN_REG_Q) |
|    |   | Cycle 1: OUT_REG_Q <= F(IN_REG_Q) |
| 11 | 3 | Cycle 1: OUT_REG_I <= F(IN_REG_I) |
|    |   | Cycle 1: OUT_REG_Q <= 0 |
| 00 | 4 | Cycle 1: OUT_REG_I <= F(IN_REG_I) |
|    |   | Cycle 2: OUT_REG_Q <= F(IN_REG_Q) |

The described class of (vector) instructions (applicable for certain arithmetic operations like reciprocal, square root, etc), supports an approach of doing real-complex multiplication operations instead of complex-complex multiplication operations. This by itself has the advantage of lower energy consumption in the multiplier circuits, and also fewer resources occupied for the operations (four multipliers instantiated per element pair to support complex-complex multiplication instructions may in stead be used for two parallel real-complex multiplication instructions).

The class of instructions can be used in a vector DSP to, for example, calculate a vector of P scaling values using only P/2 arithmetic circuits, thus reducing area cost without adding latency to the instruction (e.g. compared to a two-step approach).

A further advantage is that no energy is wasted on calculating the same real value for the neighboring elements.

The presented approach does not require replication of input elements in both real/imaginary elements via another explicit instruction (e.g. a vector shuffle operation, or element swap operation), which would add latency.

Circuits on which the proposed class of instructions can be mapped may also be used to do the arithmetic operation for P different input values.

The described embodiments and their equivalents may be realized in software or hardware or a combination thereof. They may, for example, be performed by general-purpose circuits associated with or integral to a communication device, such as digital signal processors (DSP).

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Figure 6:
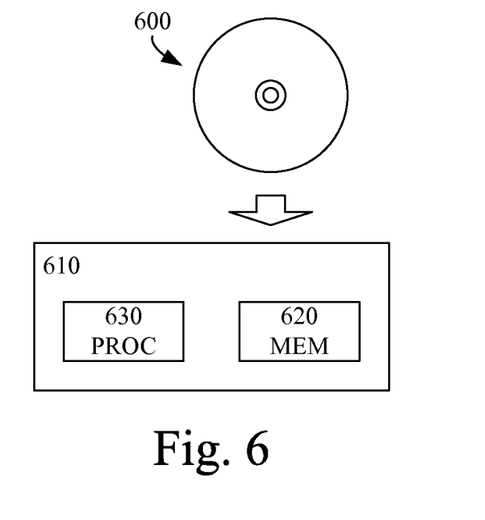
FIG. 6 is a schematic drawing illustrating a computer readable medium according to some embodiments.

According to some embodiments, a computer program product comprises a computer readable medium such as, for example, a diskette or a CD-ROM as illustrated by 600 of FIG. 6. The computer readable medium 600 may have stored thereon a computer program comprising program instructions, wherein at least one of the instructions is an instruction of the first, second or third type. The computer program may be loadable into a data-processing unit 630, which may, for example, be comprised in a mobile terminal 610. When loaded into the data-processing unit, the computer program may be stored in a memory 620 associated with or integral to the data-processing unit. According to some embodiments, the computer program may, when loaded into and run by the data-processing unit, cause the data-processing unit to execute method steps according to, for example, the methods shown in any of the FIGS. 4 and 6.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A calculation circuit for a digital signal processor, the calculation circuit being configured to, responsive to the digital signal processor executing, during a first operation cycle, a first program instruction selected from a digital signal processor instruction set comprising at least a first instruction type and a second instruction type, produce a first real valued output and a second real valued output based on at least one of a first real valued input and a second real valued input, the first and second real valued inputs organized as adjacent elements of a first vector which is an input vector, the calculation circuit comprising:

a selector configured to select one of the first real valued input and the second real valued input as a given real valued input, based on a selection control signal, wherein the selector is configured to select the first real valued input as the given real valued input responsive to the selection control signal indicating that the first instruction type is being executed and the selector is configured to select the second real valued input as the given real valued input responsive to the selection control signal indicating that the second instruction type is being executed;

an arithmetic calculation unit configured to perform an arithmetic operation on the selected real valued input to provide a real valued result;

an output provider adapted to provide the first real valued output and the second real valued output during the first operation cycle based on the real valued result, the first and second real valued outputs being organized as adjacent elements of a second vector which is an output vector; and a controller configured to:
provide the selection control signal to the selector based on the first program instruction and, in response to the first program instruction being one of the first instruction type and the second instruction type, cause the output provider to provide the real valued result as the first real valued output and to duplicate the real valued result as the second real valued output, such that the second vector is a real valued vector of scaling values, for real-complex multiplication with a third vector that is a complex valued vector, using a real-real multiplication instruction.

2. The calculation circuit of claim 1 further comprising:
at least one input register operatively connected to the selector; and
at least one output register operatively connected to the arithmetic calculation unit and adapted to provide at least one of the first real valued output and the second real valued output.

3. The calculation circuit of claim 1 wherein the digital signal processor instruction set further comprises a third instruction type, and wherein:
the selector is further configured to select the first real valued input as the given real valued input responsive to the selection control signal indicating that the third instruction type is being executed; and
the controller is further configured to, in response to the first program instruction being of the third instruction type,
cause the output provider to provide the real valued result as the first real valued output and a zero value as the second real valued output, such that the second vector is a complex valued vector for complex-complex multiplication with the third vector.

4. A digital signal vector processor comprising:
a number, P/2, of calculation circuits according to claim 1, together being configured to provide the second vector having a real valued vector length, P; and
a vector multiplication unit configured to perform real-complex multiplication between the real valued second vector and the complex valued third vector having a complex valued vector length, P/2.

5. A digital signal vector processor comprising:
a number, P/2, of calculation circuits according to claim 3, together being configured to provide the complex valued second vector having a complex valued vector length, P/2; and
a vector multiplication unit configured to perform complex-complex valued multiplication between the complex valued second vector and the complex valued third vector.

6. An electronic device comprising the calculation circuit of claim 1.

7. The electronic device of claim 6, wherein the electronic device is a wireless communication device.

* * * * *